United States Patent [19]
Marcus

[11] 3,891,798
[45] June 24, 1975

[54] TRACKER UNIT

[75] Inventor: Thomas J. Marcus, Gahanna, Ohio

[73] Assignee: Rockwell International Corporation, Pittsburgh, Pa.

[22] Filed: Mar. 19, 1971

[21] Appl. No.: 126,288

[52] U.S. Cl. ... 178/6.8; 178/DIG. 21; 178/DIG. 33; 178/DIG. 34
[51] Int. Cl.$^2$ .......... H04N 7/18
[58] Field of Search. 178/DIG. 21, DIG. 3, DIG. 34, 178/6.8

[56] References Cited

UNITED STATES PATENTS

| | | | |
|---|---|---|---|
| 2,978,535 | 4/1961 | Brown | 178/6 |
| 3,035,121 | 5/1962 | Schreiber | 178/DIG. 3 |
| 3,071,727 | 1/1963 | Kitsopoulos | 178/DIG. 3 |
| 3,299,204 | 1/1967 | Cherry et al. | 178/6 |
| 3,361,872 | 1/1968 | Sweeney | 178/6 |
| 3,366,735 | 1/1968 | Hecker | 178/7.2 |
| 3,419,674 | 12/1968 | Burns et al. | 178/6 |

*Primary Examiner*—Howard W. Britton

[57] ABSTRACT

A tracker unit for use in a tracking system having a television camera sensor, the tracker unit having a video signal processor that converts the sensor output video signal into contrast marker pulses that identify contrast changes of interest in the sensor field of view, including changes associated with target edge features and target interior contrast features, with increased sensitivity. The tracker unit also functions to combine those contrast marker pulses identified with target edges or target interior contrast features with tracking gate pulses on a coincidence basis for the purposes of detecting or establishing tracking errors and developing improved tracking system performance therefrom.

6 Claims, 8 Drawing Figures

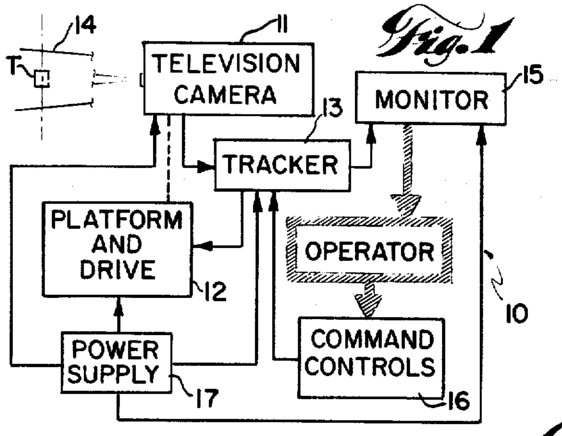
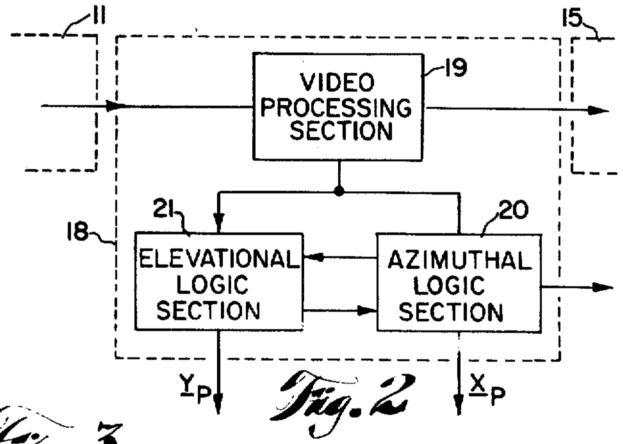
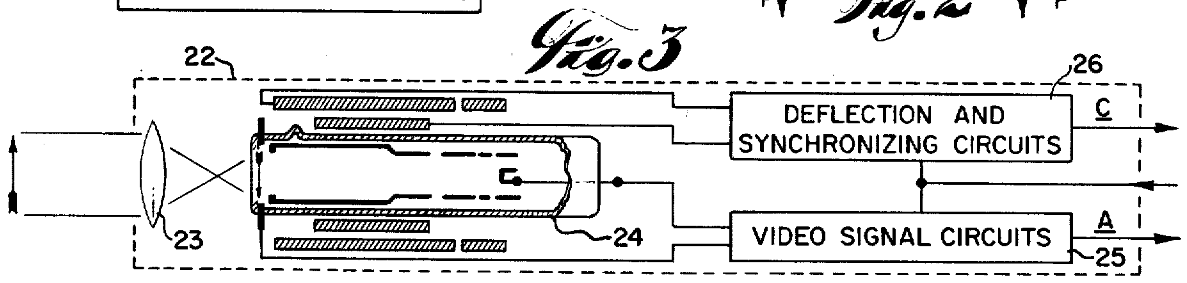
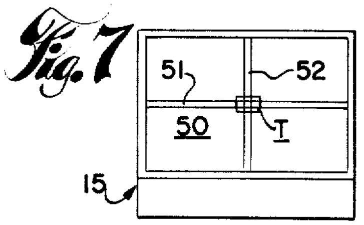
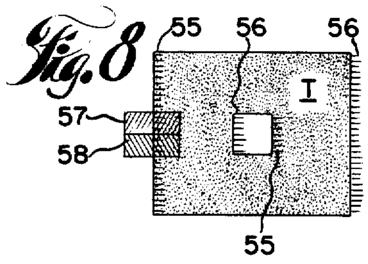
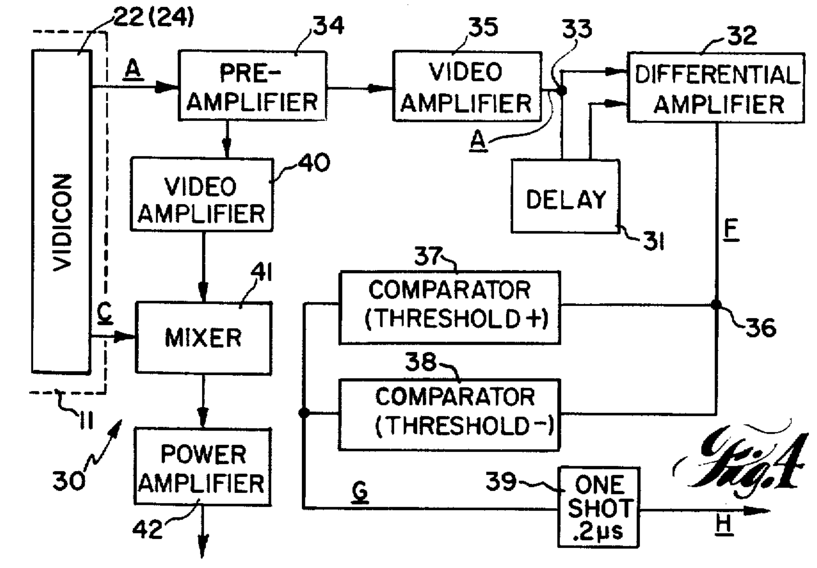
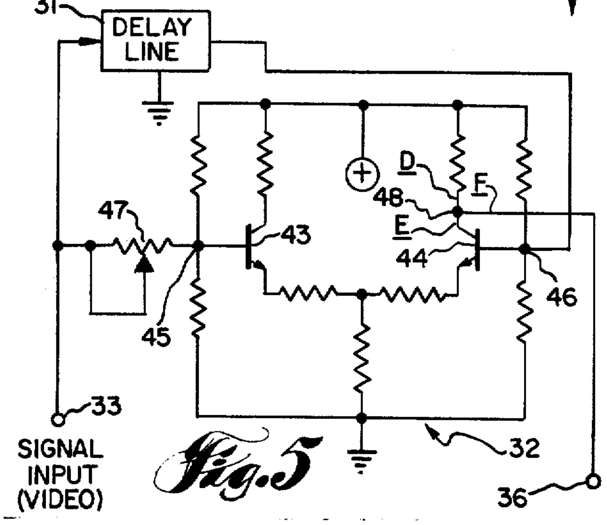
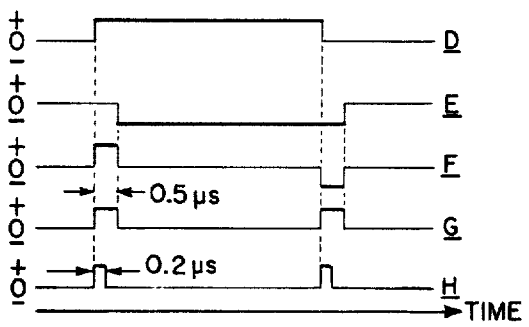
Fig. 6
INVENTOR
THOMAS J. MARCUS
BY
ATTORNEY

TRACKER UNIT

SUMMARY OF THE INVENTION

The tracker unit of the instant invention consists of a video signal processor differential amplifier means that receives the sensor output video signal, after conventional amplification as necessary, at one input terminal in a direct manner and at the other input terminal in a delayed manner. The direct and delayed video signal inputs are difference-combined in the differential amplifier means to produce output contrast marker pulses with increased sensitivity relative to detected contrast features, including detected target edges and target interior contrast features, in the sensor video signal. The differential amplifier output pulses are subsequently combined with tracking gate pulses in a tracking logic section that also constitutes a part of the tracker unit. Tracking errors detected or established on the basis of time coincidence of the combined pulses are then developed into tracking error correction signals in the tracker unit tracking logic in a conventional manner.

FIG. 1 is a functional block diagram of one form of a tracking system of the type to which the instant invention has application;

FIG. 2 is a functional block diagram of one form of a tracker unit for the tracking system of FIG. 1 and which may advantageously incorporate the features of this invention;

FIG. 3 is a combined sectional view and functional block diagram of a vidicon form of television camera unit for the tracking system of FIG. 1 and for combination with a tracker unit having the features of this invention;

FIG. 4 is a functional block diagram of the video processor section of the tracker unit of this invention;

FIG. 5 is a circuit diagram of the components that comprise the delay and differential amplifier portion of the video processor illustrated by FIG. 4;

FIG. 6 is a signal timing diagram relating to the circuit arrangement illustrated in FIG. 5;

FIG. 7 illustrates the monitor unit shown in FIG. 1 and the typical relationship of a target to the sensor field of view during system tracking; and FIG. 8 illustrates a typical relationship that exists as between target edge and target interior contrast features, resulting contrast marker pulses, and one form of tracking gate during system tracking.

DESCRIPTION OF THE INVENTION

The type of tracking system which this invention is broadly concerned with is illustrated generally by the functional block diagram of FIG. 1. Such tracking system is referenced as 10 and is basically comprised of an optical sensor in the form of television camera unit 11, a platform and drive unit 12, and a tracker unit 13. The platform portion of unit 12 is connected to and normally serves to support television camera 11; during operation of system 10 in its automatic tracking mode the drive portion of unit 12 maintains the platform and connected camera unit 11 in tracking relation to the relatively movable target T positioned within the field of view designated 14. Tracker unit 13 regulates tracking movement of platform and drive unit 12 and couples that unit to television camera 11 in a closed loop control relation. In addition, system 10 generally includes a monitor unit 15 which takes the form of a typical monochrome television picture tube and which is used to present a visual display of the general tracking problem viewed by the optical sensor and an indication of system tracking alignment. A human operator provides the link which exists between monitor unit 15 and the command controls function designated 16. The operator is normally responsible for accomplishing such command functions as activating the system, selecting the system mode of operation (scanning or automatic tracking), selecting the target to be tracked, and obtaining acquisition of the selected target in the system tracking reticle prior to locking-on for automatic system tracking.

FIG. 3 is included in the drawings to provide a schematic illustration of a type of television camera unit that has been utilized as a sensor for a tracking system 10 which incorporates a tracker unit having the features of this invention. Such television camera unit is referenced generally as 22 and is basically comprised of a lens system 23, a camera tube 24, conventional video signal circuits 25, and conventional deflection and synchronizing circuits 26. For the purpose of this invention a specific form of television camera tube is not necessary; however, a vidicon-type camera tube such as is shown as component 24 of FIG. 3 has been utilized as the optical sensor portion of a tracking system having an actual embodiment of this invention. The specific vidicon-type camera tube 24 had a signal electrode photoconductive layer with a ⅜ inch × ½ inch format. The video signal circuits 25 and the deflection and synchronizing circuits 26 associated with the actually-used unit 22 operated to produce a standard one-volt television camera output video signal (A) and a composite horizontal and vertical synchronization signal (C) with a field repetition rate of 60 cycles per second. Since closed-loop circuits are normally used, it is not required that signals A and C be combined for transmission. Such signals, as used, did produce a standard raster comprised of 525 lines; interlacing of separate field frames can be used but is entirely optional insofar as the hereinafter-claimed invention is concerned.

FIG. 2 illustrates the functional block construction of a tracker unit 18 having a form which is satisfactory for the tracking system of FIG. 1 and which may advantageously incorporate the features of this invention. Tracker unit 18 is essentially comprised of a video processing section 19, an azimuthal logic section 20, and an elevational logic section 21. Basically, tracker unit 18 receives the output signals of television camera unit 11 and by preferred apparatus and information processing methods derives the output tracking error correction signals $X_p$ and $Y_p$ that may conveniently be used to control azimuthal and elevational movement of platform unit 12 (and camera unit 11) during an automatic tracking mode of system 10 operation. Output signal $X_p$ is an azimuthal error correction signal developed as a result of the coincidence of contrast marker pulses produced by video processing section 19 with tracking gate pulses established by azimuthal logic section 20. Output signal $X_p$ is produced by elevational tracking logic section 21 also using contrast marker pulses developed by video processing section 19 and coincidence gating techniques. No particular manner of developing azimuthal or elevational tracking error signals and subsequent tracking error correction is required for the practice of this invention since the essential requirements of the invention reside in features of video processing section 19.

A preferred embodiment of video processing section 19 for tracker unit 18 is illustrated schematically and referenced generally as 30 in FIG. 4. The critical elements of section 30 are delay means 31 and differential amplifier means 32. The sensor video signal A is received at input 33 after processing from camera unit 22 through conventional pre-amplifier 34 and conventional video amplifier 35. The output signal of differential amplifier 32 is provided from output terminal 36 to comparator circuits 37 and 38. Circuit 37 is of conventional construction and functions to establish a threshold for passing those positive going pulses from differential amplifier 32 that are of tracking interest; the other comparator circuit 38 establishes a threshold value for the negative-going pulses that are received from 36 and that are of tracking interest. Circuits 37 and 38 are also preferably arranged to have the characteristic of acting as a fullwave rectifier with respect to the different pulses received from differential amplifier 32, since in the FIG. 4 scheme the output signals from comparator circuits 37 and 38 are conducted to one-shot circuit 39 for conversion into a marker pulse of prescribed amplitude and time duration. One-shot circuit 39 is typically in the form of a monostable multivibrator circuit. Video amplifier 40, mixer 41, and power amplifier 42 are of conventional construction and are provided in video processing section 30 as a matter of convenience for developing video signal A and deflection and synchronization signal C into suitable form for monitor unit 15.

The circuit details provided in FIG. 5 essentially relate to a preferred construction for differential amplifier 32. As shown in FIG. 5, differential amplifier 32 is constructed in a conventional manner utilizing transistor elements 43 and 44. The video signal received at 33 is conducted directly to non-inverting input point 45 and in a delayed manner through delay line 31 to inverting input point 46. Delay line 31, in an actual embodiment of the instant invention, developed a delay of 0.5 microsecond for the delayed version of video signal A. Potentiometer 47 is included to balance the two input drives so that during the instant the points 45 and 46 contain input signals the output signal at point 48 is zero. Accordingly, differential amplifier 32 functions to produce an output signal F at terminal 36 that represents the difference between the direct and delayed video signals conducted to points 45 and 46.

The timing diagram of FIG. 6 illustrates the waveform of signals D through H that exist during operation of video processing section 30. Signal D is the direct video signal of interest and signal E is the inverted and delayed form of that video signal. Both are combined at point 48 to produce resulting signal F. Assuming that the amplitudes of the positive-going and negative-going portions of signal F are of interest and therefore above and below the threshold values established in comparator circuits 37 and 38, signal G results. The width of each pulse in signal G remains at the value established by the delay of delay means 31. A contrast marker pulse of reduced width is generally preferred for subsequent processing in the tracker unit tracking logic. One-shot circuit 39 is provided to accomplish that objective. In the case of one tracking system incorporating the instant invention, circuit 39 functions to provide pulses of 0.2 microsecond duration and of identical polarity at a prescribed amplitude. The output signal of circuit 39 is designated H in the drawings.

Signal processing within logic sections 20 and 21 of tracker unit 18 varies with the construction actually utilized but in each instance coincidence gating of signal H with a tracking gate is normally involved. Some tracker units to which the instant invention has application use directional tracking gates of singular pulse form in the different television camera lines of scan, such gates being driven in an edge-repelling manner. Other tracker units may operate with paired side by side directional tracking gates that are driven in a balancing manner or even with tracking gates that are driven in an edge-attracting manner. The exact form of tracking logic employed in tracker unit 18 to accomplish the desired manners of detecting tracking error and developing tracking error correction is not critical to the present invention.

FIG. 7 illustrates a monitor unit 15 having a system tracking alignment condition displayed on tube 50. Normally, the system tracking gates are correlated in position to the reticle pairs 51 and 52 to detect or establish tracking error and to develop tracking error correction signals. Contrast marker pulses are developed as a result of contrast changes detected in the camera video signal and identifying edge features of target interior contrast features. Leading edge or positive-going marker pulses are related to the positions designated 55 in FIG. 8. Trailing edge or negative-going contrast features are associated with the positions designated 56. The tracking gates may have a space-time extent corresponding to that illustrated by the blocks designated 57 and 58.

I claim:

1. In a tracking system tracker unit which develops tracking error correction signals from a single television camera sensor video signal, in combination:

a. Differential amplifier means having an inverting input terminal, a ion-inverting input terminal, and an output terminal, and producing a difference signal at said differential amplifier means output terminal that represents the amplitude difference of the signals then existing at said differential amplifier means input terminals, b. Video signal delay means, c. Conductor means transmitting a single television camera sensor video signal to one of said differential amplifier means input terminals delayed in time by said video signal delay means and transmitting said single television camera sensor video signal to the other of said differential amplifier means input terminals not delayed in time by said video signal delay means; and d. Tracking logic means coincidence gating target marker pulses with tracking gate pulses to develop tracking error correction signals, said target marker pulses being derived from the amplitude of said differential amplifier means difference signal produced at said differential amplifier means output terminal.

2. The invention defined by claim 1, wherein said video signal delay means delays said single television camera sensor video signal transmitted to said one differential amplifier means input terminal by approximately 0.5 microsecond.

3. The invention defined by claim 1, wherein said tracker unit further consists of comparator circuit means receiving said differential amplifier means output difference signal and conducting portions of said output difference signal existing beyond a threshold amplitude value to a comparator circuit means output terminal, said tracking logic means receiving target marker pulses derived from the existence of conducted portions of said differential amplifier means output difference signal at said comparator circuit means output terminal.

4. The invention defined by claim 1, wherein said tracker unit further includes a monostable multivibrator circuit means having an output terminal and an input terminal, said monostable multivibrator circuit means generating said target marker pulses at said monostable multivibrator circuit means output terminal from changes in signal voltage amplitude derived from said differential amplifier means differential signal and existing at said monostable multivibrator circuit means input terminal.

5. The invention defined by claim 4, wherein said video signal delay means delays said single television camera sensor video signal transmitted to said one differential amplifier means input terminal by approximately 0.5 microsecond.

6. The invention defined by claim 4, wherein said monostable multivibrator circuit means produces target marker pulses having an individual time duration of approximately 0.2 microsecond.

* * * * *

UNITED STATES PATENT OFFICE
CERTIFICATE OF CORRECTION

PATENT NO. : 3,891,798

DATED : June 24, 1975

INVENTOR(S) : Thomas J. Marcus

It is certified that error appears in the above-identified patent and that said Letters Patent are hereby corrected as shown below:

Column 2, line 63, change "$X_p$" to -- $Y_p$ -- .

Column 3, line 46, change "the" second instance to -- that -- .

Column 4, line 28, change "of" to -- or -- .

Column 4, line 41, change "ion-inverting" to -- non-inverting -- .

Signed and Sealed this

*sixth* Day of *January 1976*

[SEAL]

*Attest:*

RUTH C. MASON
*Attesting Officer*

C. MARSHALL DANN
*Commissioner of Patents and Trademarks*